Patented Oct. 16, 1923.                                    1,470,794

UNITED STATES PATENT OFFICE.

VIGGO VALDEMAR JULIUS ANDRESEN, OF COPENHAGEN, DENMARK.

DENTIFRICE.

No Drawing.          Application filed April 15, 1921.   Serial No. 461,636.

*To all whom it may concern:*

Be it known that I, VIGGO VALDEMAR JULIUS ANDRESEN, a subject of the King of Denmark, and residing at Copenhagen, Denmark, have invented certain new and useful Improvements in Dentifrices, of which the following is a specification.

The present invention has reference to improvements in dentifrices and relates more specifically to a dentifrice whose main object, aside from its purely mechanical cleaning action, is to build up or mineralize the natural tooth bone and enamel by providing for the teeth a surrounding rich in substances that tend to improve the tooth structure by diffusion and other processes, as a result of which underdeveloped enamel is mineralized and fortified and parts that have become more or less demineralized are remineralized.

It is a well known fact that active amounts of salts akin to the bone and enamel substances of the teeth, such as for instance calcium phosphate and carbonate, will readily dissolve in liquids containing carbonic acid, and if the teeth are surrounded by such a solution an enamel hardening process will be set up. To this must be added that a liquid containing carbonic acid exercises also a solvent action on the mucine and other tooth coatings, which latter tend to hamper the mineralizing process.

It has further been proposed that as substances developing carbonic acid during the reaction to form combinations of the stated character such are used as are apt to dissolve to a certain extent in the carbonic acid containing liquids and which are valuable for the mineralization of the tooth substance.

I, now, have found that the circumstances or conditions under which the generation of the carbonic acid is brought about and comes to act, play a highly important rôle in obtaining the best results.

On the one hand, obviously, it is desirable that a copious generation of carbonic acid is obtained, whilst on the other hand experience has shown that such reaction owing to its nature is altogether too brisk, so that there is not time enough to properly make full use of it for the purposes indicated.

I have found that with enamel hardening preparations of this character it is imperative for obtaining the best results to be able to control, or to state it more precisely, to retard the development of carbonic acid in such a manner that it is spread over a materially longer period than would obtain under ordinary conditions, without, however, diminishing in any way the total amount of carbonic acid generated. By numerous experiments I have succeeded in establishing that for the intended purposes organic substances whose molecules contain amine or hydroxyl groups that enter into reversible combinations with carbonic acid, are the most suitable, and a dentifrice containing such substances shows in use a much more marked action on the teeth than in the case of preparations in which the generation of carbonic acid is not controlled.

In compounding my new dentifrice I may use, by way of example, the following ingredients in the amounts by weight as stated:

140 parts of bicarbonate of soda.
112 parts of tartaric acid.
10 parts of ammonium chloride.
40 parts of sodium chloride.
40 parts of calcium phosphate.
40 parts of calcium carbonate.
40 parts of magnesium carbonate, and
40 parts of organic substances of the amine or hydroxyl groups such as for instance amino acids or, broadly, glycocoll, or albumins built up of amine groups, wittepepton, casein, gelatine, or the like, which with carbonic acid form reversible combinations.

This proportion of the ingredients, I want it to be distinctly understood, can be varied to a considerable degree as far as their character and relative weight ratio is concerned, as long as organic substances containing molecules of the amine or hydroxyl groups such as indicated are used in requisite amounts.

What I claim is:—

1. A dentifrice of the character set forth, containing reactive substances adapted to generate carbonic acid, lime salts of a composition analogous to the tooth material, and organic substances capable of forming reversible combinations with the carbonic acid.

2. A dentifrice of the character set forth, containing reactive substances adapted to generate carbonic acid and organic substances capable of retaining the generated carbonic acid in solution and of forming reversible combinations with the carbonic acid, and lime salts of a composition analogous to the tooth material.

3. A dentifrice of the character set forth, comprising substantially 140 parts by weight of bicarbonate of soda, 112 parts tartaric acid, 10 parts ammonium chloride, 40 parts sodium chloride, 40 parts calcium phosphate, 40 parts calcium carbonate, 40 parts magnesium carbonate, and 40 parts of glycocoll.

VIGGO VALDEMAR JULIUS ANDRESEN.